(12) United States Patent
Khalfallah et al.

(10) Patent No.: US 7,058,302 B2
(45) Date of Patent: Jun. 6, 2006

(54) FREQUENCY EXTRACTOR

(75) Inventors: Sabry Khalfallah, Paris (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 800 days.

(21) Appl. No.: 10/079,877

(22) Filed: Feb. 22, 2002

(65) Prior Publication Data

US 2002/0118418 A1 Aug. 29, 2002

(30) Foreign Application Priority Data

Feb. 23, 2001 (FR) .................................. 01 02502

(51) Int. Cl.
*H04B 10/00* (2006.01)

(52) U.S. Cl. .......................................... 398/48; 398/79

(58) Field of Classification Search ............ 398/79–88, 398/48–51; 385/24
See application file for complete search history.

(56) References Cited

U.S. PATENT DOCUMENTS

| 5,434,937 A | * | 7/1995 | Glance ........................ 385/24 |
|---|---|---|---|
| 5,461,685 A | * | 10/1995 | Glance et al. ................ 385/24 |
| 5,493,625 A | * | 2/1996 | Glance ........................ 385/24 |
| 5,566,014 A | * | 10/1996 | Glance ........................ 398/83 |
| 5,745,612 A | | 4/1998 | Wang et al. |

FOREIGN PATENT DOCUMENTS

| EP | 0 655 874 A2 | 5/1995 |
|---|---|---|
| EP | 0 720 408 A2 | 7/1996 |

* cited by examiner

*Primary Examiner*—Agustin Bello
(74) *Attorney, Agent, or Firm*—Sughrue Mion, PLLC

(57) ABSTRACT

A selective frequency extractor is disclosed which forwards one or more selected frequencies of a wavelength division multiplex input signal consisting of N channels to one output port and all the other frequencies to another output port. A reconfigurable frequency add and drop multiplexer is also disclosed. The input signal is divided up by a first demultiplexer and routed to a plurality of interleaved stages of optical switches for selectively feeding a plurality of input ports of a multiplexer, whose routing properties are then used for extracting one or more frequencies from the input signal or for reconfigurable frequency add and drop multiplexing.

5 Claims, 3 Drawing Sheets

FREQUENCY EXTRACTOR

CROSS-REFERENCE TO RELATED APPLICATIONS

This application is based on French Patent Application No. 01 02 502 filed Feb. 23, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to wavelength division multiplex fiber optic transmission systems. To be more precise, the invention relates to an extractor for extracting a selected frequency from a wavelength division multiplex signal containing N frequencies and to a frequency switch and reconfigurable frequency add and drop multiplexer.

The context of the invention is therefore that of optical switching architectures.

2. Description of the Prior Art

Identical frequencies transporting different information for different destinations arrive at optical switching nodes. It is necessary to route the information to the respective destinations at the switching node.

This is done by optical switches which add and drop optical channels.

Many add and drop multiplexers and switches of this type are already known in the art.

For example, FIG. 1 is a diagram showing a multiplexer for multiplexing N channels. The multiplexer is described in the paper "Integrated Multichannel Optical Wavelength Selective Switches Incorporating an Arrayed Waveguide Grating Multiplexer and Thermooptic Switches", published in April 1998 in the review J. of Lightwave Technol., vol. 16, No. 4, pages 650–655.

The multiplexer shown in FIG. 1 includes an arrayed waveguide grating (AWG) 3. The arrayed waveguide grating 3 has 2N+2 input ports 1 to 2N+2 and 2N+2 output ports 1 to 2N+2. An array of N 2×2 optical switches $SW_1$ to $SW_N$ interconnects the various input and output ports of the arrayed waveguide grating 3 via loopback lines 4.

In a first input multiplex M1 information i1, i2, . . . , iN is coded on respective frequencies f1, f2, . . . , fN and in a second input multiplex M2 information i'1, i'2, . . . , i'N is coded on respective frequencies f1, f2, . . . , fN.

Thus the same frequencies f1 to fN carry different information. Information coded on a particular frequency is extracted and thereafter other information on the same frequency is inserted.

In the FIG. 1 example, a typical requirement is to recover information i2 coded on the frequency f2 and information iN coded on the frequency fN and to code information i'2 and i'N on the same frequencies instead.

The principle of operation for this particular example is based on the fact that the frequencies of the first multiplex that enter at the input port 1 will be demultiplexed to the output ports N+3 to 2N+2 and that all the frequencies of the second multiplex that enter at the port N+2 are demultiplexed to the output ports 2 to N+1.

The signals demultiplexed in this way are then guided toward the N 2×2 optical switches $SW_1$ to $SW_N$. Signals with the same frequency fi from the two input multiplexes M1 and M2 are forwarded to the same 2×2 switch SWi. The output signals switched by the N 2×2 switches are then looped back to the input ports of the arrayed waveguide grating 3.

The signals looped back to the input ports N+3 to 2N+2, on the one hand, and the input ports 2 to N+1, on the other hand, are automatically remultiplexed and forwarded to the respective output ports 1 and N+2 of the arrayed waveguide grating.

For a particular frequency fi, each switch SWi forwards the signal coded on that frequency fi either to the first set of input ports 2 to N+1, to be more precise to the input port i+1, or to the second set of input ports N+3 to 2N+2, to be more precise to the input port i+N+2. Each switch SWi therefore in fact changes the output port number 1 or N+2 to which the information coded at the frequency fi will be forwarded.

Also, if only one input port is used, a simple frequency extraction function is implemented, because each frequency constituting the input multiplex can be forwarded independently to one of the two output ports 1 or N+2, depending on the switch configuration adopted.

However, the FIG. 1 router, i.e. the AWG, is in no way optimized in terms of the number of channels. To be able to process N channels with this kind of architecture, a router that is capable of routing 2N+2 channels is required. The arrayed waveguide grating is therefore overspecified as it must have 2N+2 input ports and 2N+2 output ports to process N frequencies.

Consequently, this amounts to an approximate doubling of the number of waveguides in the arrayed waveguide grating, which makes the system complex and costly.

Another drawback of the above solution is that it is based on the use of 2×2 optical switches.

If the switches used are thermooptic switches, the operating speed is limited. With switches of this type, it is not possible to select frequency coded information in less than a few nanoseconds.

Switches based on optical amplifiers can be used for faster operation, however. Nevertheless, to produce a 2×2 switch based on optical amplifiers, it is necessary to use four active components, as against only two for a thermo-optical switch. Accordingly, in the FIG. 1 example, if a fast solution is implemented based on optical amplifiers, it is necessary to provide 4N active components, which represents a penalty in terms of power consumption.

Thus regardless of the technology employed, using 2×2 optical switches is unsatisfactory.

Consequently, the object of the present invention is to provide a compact and fast system that is capable of selectively extracting one or more frequencies from a wavelength division multiplex input signal, i.e. that is capable of relaying all the input frequencies with the exception of at least one selected frequency to the same output port and the selected frequency or frequencies to another output port.

The invention also proposes to expand the architecture of the extractor to encompass more complex functions, and in particular to provide a reconfigurable frequency add and drop multiplexing function that alleviates the drawbacks of the prior art previously cited.

To this end, the invention exploits the routing properties of arrayed waveguide grating multiplexers to extend the architecture of a conventional wavelength selector to an architecture including a plurality of stages of interleaved optical switches.

The incoming wavelength division multiplex optical spectrum is therefore divided by a first demultiplexer and forwarded to a plurality of interleaved stages of optical switches for selectively feeding a plurality of input ports of a multiplexer, whose routing properties are then used to implement the complex functions referred to above, i.e. extracting one or more frequencies from the input multiplex, reconfigurable frequency add and drop multiplexing, or reconfigurable frequency switching.

SUMMARY OF THE INVENTION

The invention therefore provides a selective frequency extractor for forwarding one or more selected frequencies of a wavelength division multiplex input signal consisting of N channels to one output port and all other frequencies to another output port, which extractor includes:

- a demultiplexer having at least one input port and at least N output ports: for any value of i from 1 to N, the $i^{th}$ output port of the demultiplexer is adapted to receive the corresponding $i^{th}$ frequency of the input signal,
- a multiplexer having at least N+1 input ports and at least two output ports: for any value of i from 1 to N, the $i^{th}$ input port of the multiplexer is adapted to forward the $i^{th}$ frequency of the input signal to a first output port of the multiplexer, and for any value of i from 2 to N+1, the $i^{th}$ input port of the multiplexer is adapted to forward the $(i-1)^{th}$ frequency of the input signal to a second output port of the multiplexer, and
- optical switches for selectively connecting any $i^{th}$ output port of the demultiplexer, for i from 1 to N, either to the $i^{th}$ input port of the multiplexer or to the $(i+1)^{th}$ input port of the multiplexer.

The invention further provides a reconfigurable frequency add and drop multiplexer, including:

- a demultiplexer having at least two input ports for receiving two wavelength division multiplexes consisting of N channels, and at least N+2 output ports: for all values of i from 1 to N, the $i^{th}$ output port of the demultiplexer is adapted to receive the corresponding $i^{th}$ frequency of a first multiplex received at the first input port, and for any value of i from 3 to N+2, the $i^{th}$ output port of the demultiplexer is adapted to receive the $(i-2)^{th}$ frequency of the second multiplex received at the second input port,
- a multiplexer having at least N+1 input ports and at least two output ports: for any value of i from 1 to N, the $i^{th}$ input port of the multiplexer is adapted to forward the $i^{th}$ frequency of the input signal to a first output port of the multiplexer, and for any value of i from 2 to N+1, an $i^{th}$ input port of the multiplexer is adapted to forward the $(i-1)^{th}$ frequency of the input signal to a second output port of the multiplexer, and
- optical switches for selectively connecting any $i^{th}$ output port of the demultiplexer, for i from 3 to N, either to the $(i-1)^{th}$ input port of the multiplexer, or to the $i^{th}$ input port of the multiplexer, or to the $(i+1)^{th}$ input port of the multiplexer, the first and second output ports of the demultiplexer being each respectively connected to the first and second input ports and to the second and third input ports of the multiplexer, and the $(N+1)^{th}$ and $(N+2)^{th}$ output ports of the demultiplexer being each connected respectively to the $N^{th}$ input ports and to the $(N+1)^{th}$ input port of the multiplexer.

Other features and advantages of the invention will be understood better after reading the following description of one embodiment of the invention, which description is given with reference to the accompanying drawings.

DETAILED DESCRIPTION OF THE PREFERRED EMBODIMENT

Figure 1:
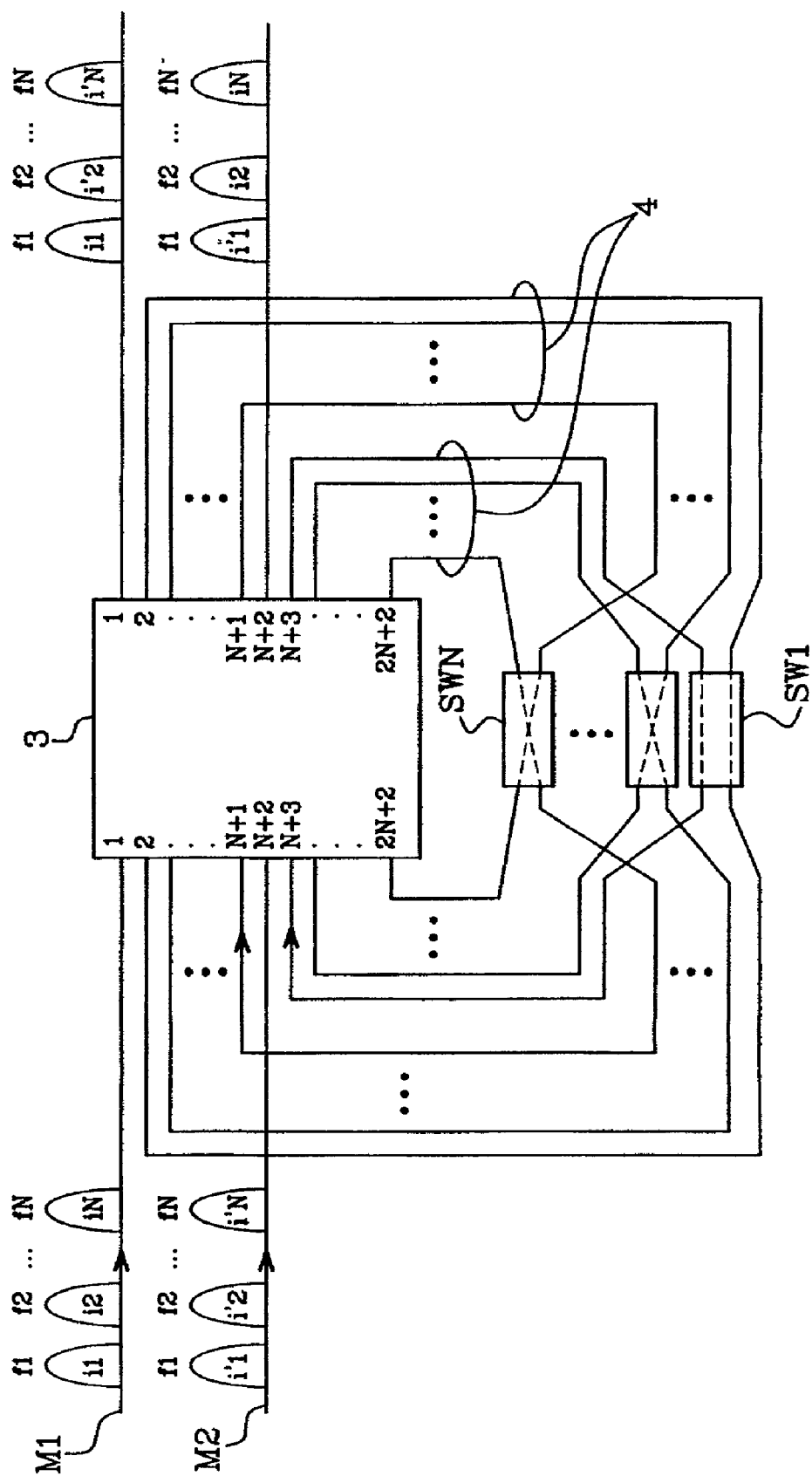
FIG. 1 is a diagram showing a prior art frequency add and drop multiplexer already described hereinabove.
Figure 2:
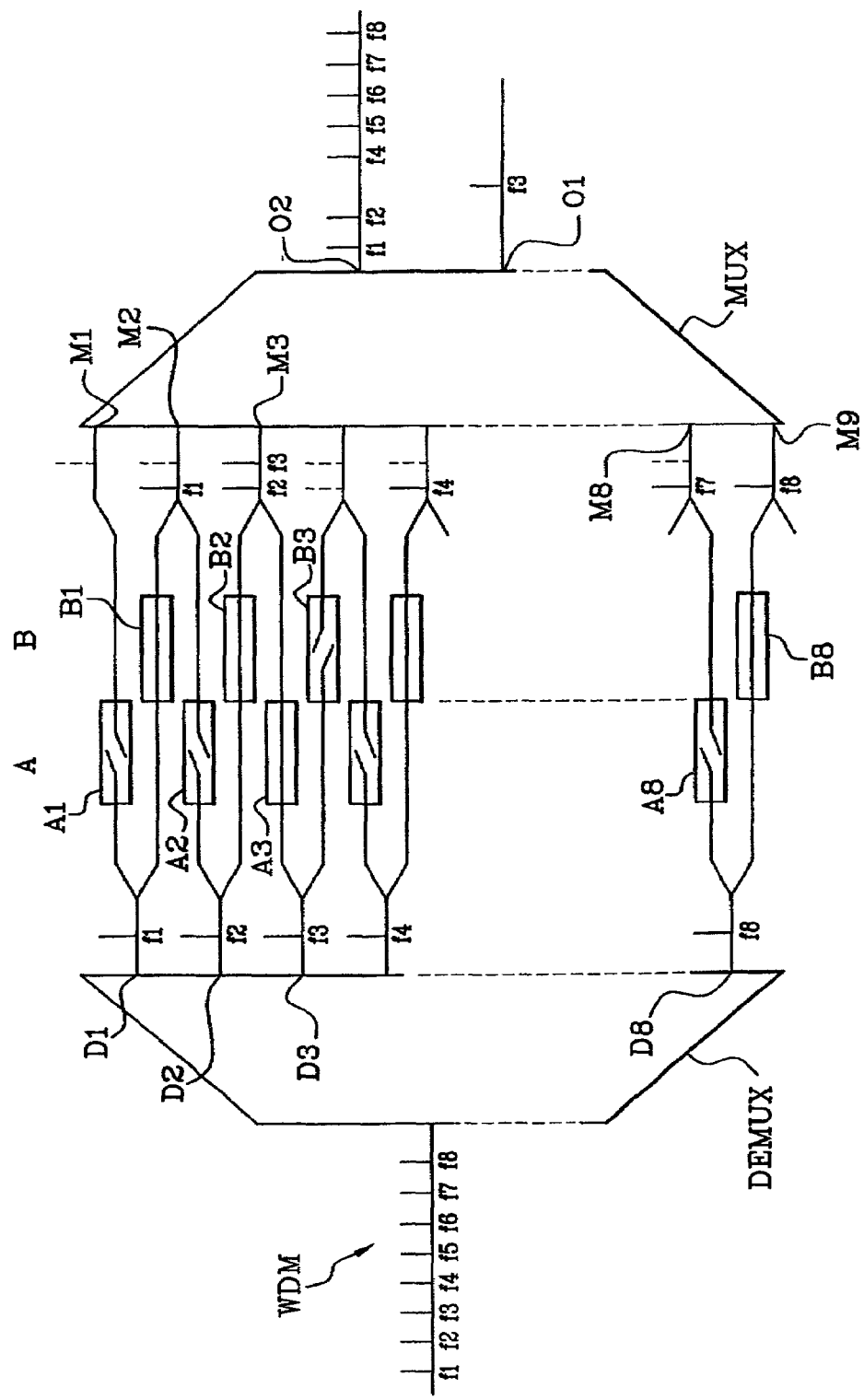
FIG. 2 is a diagram showing a selective frequency extractor according to the present invention.

FIG. 2 shows one embodiment of an extractor according to the invention.

The extractor shown in FIG. 2 includes a 1×8 demultiplexer DEMUX and a 9×2 multiplexer MUX used as a router.

The demultiplexer DEMUX and the multiplexer MUX can advantageously be of the arrayed waveguide grating type.

The respective output ports D1, D2, . . . , D8 of the demultiplexer DEMUX are connected to the input ports M1 to M9 of the multiplexer-router MUX via two interleaved optical switching stages A and B.

The first optical switching stage A includes eight optical switches A1 to A8 and the second stage B includes eight optical switches B1 to B8. The optical switches can be optical amplifiers, for example.

A wavelength division multiplex optical spectrum including eight channels f1 to f8 is demultiplexed by the 1×8 demultiplexer DEMUX. The frequencies f1 to f8 are therefore obtained at the respective output ports D1 to D8 of the demultiplexer DEMUX.

Each output port of the demultiplexer DEMUX is divided into two arms, each of which drives one of the two optical switching stages A and B. The two arms of each of the output ports D1 to D8 of the demultiplexer DEMUX are not combined at the same input port of the multiplexer-router MUX but are instead connected to different input ports of the multiplexer-router.

Accordingly, output port number 1 D1 of the first demultiplexer DEMUX is connected via two optical switches A1 and B1 respectively belonging to the first stage A of optical switches and to the second stage B of optical switches, on the one hand, to input port number 1 M1 of the multiplexer-router MUX and, on the other hand, to input port number 2 M2 of the multiplexer-router MUX.

Similarly, the second output port D2 of the first demultiplexer DEMUX is connected via respective optical switches A2 and B2, on the one hand, to input port number 2 M2 of the multiplexer-router and, on the other hand, to input port number 3 M3 of the multiplexer-router.

This scheme is repeated up to output port D8 of the first demultiplexer DEMUX, which is connected via respective optical switches A8 and B8, on the one hand, to input port number 8 M8 of the multiplexer-router and, on the other hand, to input port number 9 M9 of the multiplexer-router.

The demultiplexed frequencies are therefore divided and then forwarded or eliminated across the two optical switching stages A and B and selectively addressed to the consecutive input ports M1 to M9 of the multiplexer MUX.

In accordance with a particular routing property of the multiplexer-router MUX, considering all frequencies entering the multiplexer-router MUX with the same configuration as at the output of the demultiplexer DEMUX, i.e. the frequency f1 addressed to the input port M1 of the multiplexer, the frequency f2 addressed to the input port M2 of the multiplexer, and so on, these frequencies are multiplexed at the central output port O1 of the multiplexer-router MUX.

In contrast, considering the frequencies that are offset one port downward at the input of the multiplexer-router MUX, i.e. the frequency f1 addressed to input port number 2 M2, the frequency f2 addressed to input port number 3 M3, these frequencies are multiplexed at a higher output port, i.e. the output port 02 of the multiplexer-router MUX.

In the FIG. 2 example, in the optical switching stage A, only the switch A3 is closed and all the other switches A1, A2 and A4 to A8 are open.

A configuration complementary to that of the optical switching stage A is used in the optical switching stage B, i.e. only the switch B3 is open and all the other switches B1, B2 and B4 to B8 are closed.

The dashed lines represent frequencies that have been eliminated.

Accordingly, in the particular configuration of the optical switches described above, the frequency f3 is extracted from the input spectrum consisting of the frequencies f1 to f8.

Consequently, all the frequencies of the input spectrum except for the frequency f3 are forwarded to the same output port O2 and the extracted frequency f3 is forwarded to the other output port O1.

It is equally possible to extract several channels from the input multiplex and forward them to the same output port by activating several optical switches of the stage A and then activating the optical switches of the stage B in a complementary fashion.

This result is obtained by virtue of the routing properties of the multiplexer-router MUX and the particular principle of interconnection of the output ports D1 to D8 of the first demultiplexer DEMUX and the switches of each of the two optical switching stages A and B.

To generalize, let N be the number of channels constituting the input spectrum (N is equal to 8 in the FIG. 2 example).

The input demultiplexer is a 1×N demultiplexer having at least one input port and at least N output ports and the output multiplexer-router is a (N+1)×2 multiplexer including at least N+1 input ports and at least two output ports.

For any value of i from 1 to N, the $i^{th}$ output port Di of the demultiplexer DEMUX is adapted to receive the corresponding $i^{th}$ frequency of the demultiplexed input spectrum.

For any value of i from 1 to N, the $i^{th}$ input port Mi of the multiplexer MUX forwards the $i^{th}$ frequency fi of the input multiplex to an output port O1 and for any value of i from 2 to N+1 the $i^{th}$ input port Mi of the multiplexer MUX forwards the $(i-1)^{th}$ frequency fi−1 to a second output port O2.

The optical switches Ai and Bi selectively connect the $i^{th}$ output port Di of the demultiplexer DEMUX, with i from 1 to N, either to an $i^{th}$ output port Mi of the multiplexer MUX or to an $(i+1)^{th}$ input port Mi+1 of the multiplexer MUX.

The $i^{th}$ output port Di of DEMUX is connected, on the one hand, to the optical switch Ai of the first optical switching stage A and, on the other hand, to the optical switch Bi of the second optical switching stage B. The optical switches Ai and Bi−1 are both connected to the same $i^{th}$ input port Mi of the multiplexer-router MUX, and the optical switch Bi is connected to the $(i+1)^{th}$ input port Mi+1 of the multiplexer-router MUX.

The two optical switching stages A and B are configured in a complementary fashion.

Accordingly, for i and j from 1 to N, the optical switch or switches Ai are closed, the optical switches Aj≠i are open, the optical switch or switches Bi are open, and the optical switches Bj≠i are closed.

In this configuration, the $i^{th}$ frequency or frequencies fi are extracted and forwarded to the first central output port O1 of the device. The $i^{th}$ other frequencies (fj≠i) are multiplexed at another output port O2 of the selective frequency extractor.

The extractor according to the invention does not require to be overspecified.

For an input multiplex consisting of N frequencies, the input demultiplexer DEMUX is a 1×N demultiplexer and is therefore not overspecified and the multiplexer-router MUX of type (N+1)×1 is overspecified by only one channel.

Figure 3:
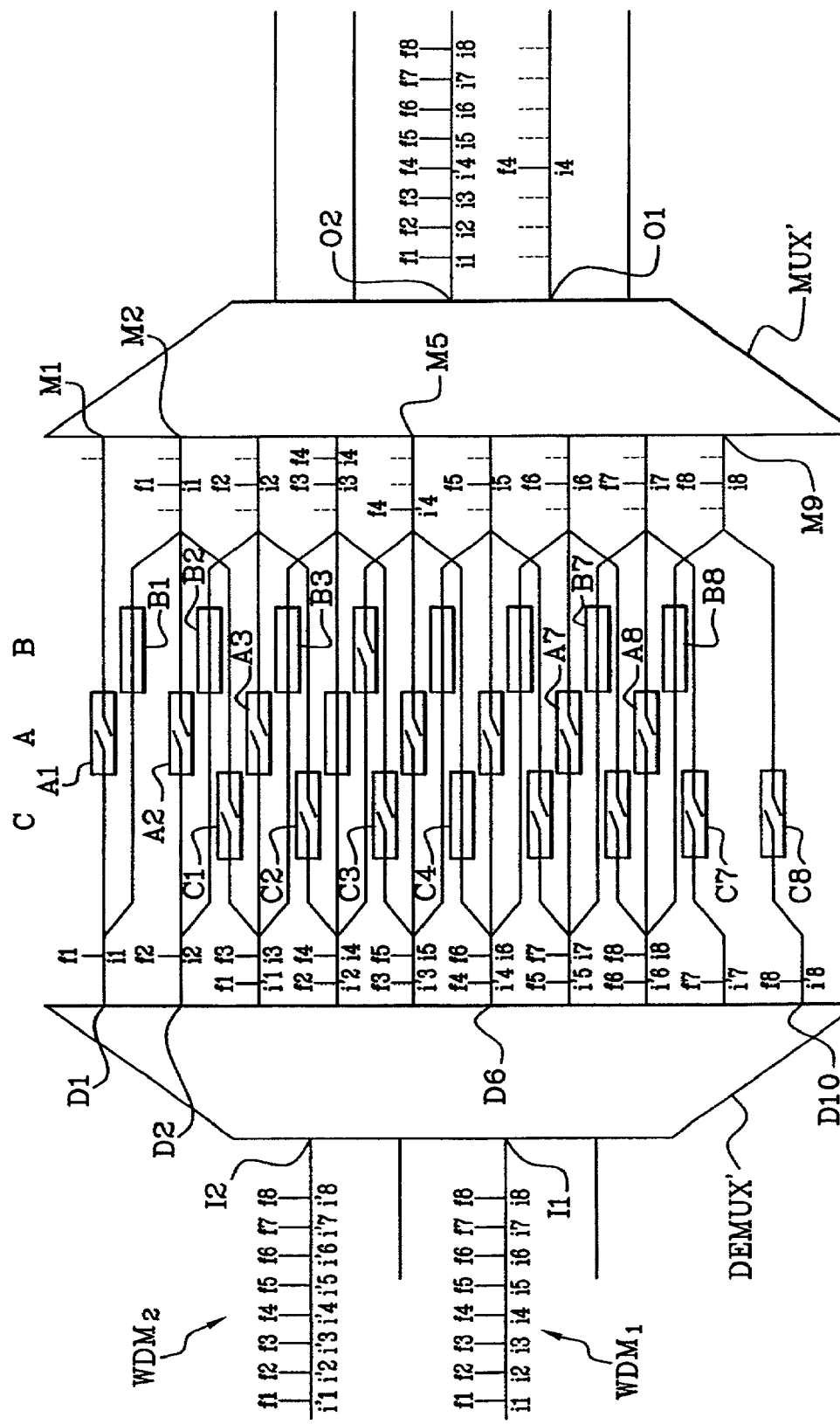
FIG. 3 is a diagram showing the principle of operation of a reconfigurable frequency add and drop multiplexer according to the present invention.

The previous architecture described with reference to FIG. 2 can be adapted to implement more complex operations, in particular reconfigurable frequency add and drop multiplexing. FIG. 3 shows this adaptation.

The principle of operation of the add and drop multiplexer shown in FIG. 3 is the same as that of the selective frequency extractor shown in FIG. 2.

The following explanation is based on wavelength division multiplex input signals consisting of N channels. In the FIG. 3 example N is equal to 8.

The multiplexer includes a first demultiplexer DEMUX' having at least two input ports I1 and I2 and at least N+2 output ports and a multiplexer MUX' having at least N+1 input ports and at least two output ports O1 and O2.

The demultiplexer DEMUX' and the multiplexer MUX' are both used as routers. They are preferably of the arrayed waveguide grating type.

The output ports D1 to DN+2 of the demultiplexer are connected to respective input ports M1 to MN+1 of the multiplexer via optical switches.

Unlike the previous architecture, the optical switches include three interleaved optical switching stages C, A and B, and each optical switching stage includes N optical switches. The optical switches can be implemented using semiconductor optical amplifiers, for example.

A first wavelength division input multiplex WDM1 consisting of frequencies f1 to fN (N=8) is received at the input port I1 of the demultiplexer DEMUX'. A second multiplex WDM2 consisting of the frequencies f1 to fN (N=8) is received at the input port I2 of the demultiplexer DEMUX'.

The two multiplexes WDM1 and WDM2 transport different information coded on the same frequencies.

Thus the multiplex WDM1 transports information i1, i2, i3, etc . . . coded on the respective frequencies f1, f2, f3, etc . . . and the multiplex WDM2 transports information i'1, i'2, i'3, etc . . . coded on respective frequencies f1, f2, f3 etc . . .

The multiplexes WDM1 and WDM2 are therefore demultiplexed by the demultiplexer DEMUX.

For i from 1 to N, the output port Di receives the information coded on the corresponding frequency fi of the first multiplex WDM1.

In accordance with a particular routing property of the demultiplexer DEMUX', as the second multiplex WDM2 is received two input ports higher relative to the central input port I1 of the demultiplexer DEMUX', it is demultiplexed two output ports lower.

Accordingly, for i from 3 to N+2, the output port Di receives the frequency fi−2 of the second multiplex WDM2 received at the input port I2.

Most of the N+2 output ports of the demultiplexer DEMUX' are divided into three arms, each of which drives one of the three optical switching stages C, A and B. The three arms are not recombined at the same input port of the multiplexer MUX', but instead connected to different input ports of the multiplexer MUX'.

For i from 3 to N, the $i^{th}$ output port Di of the demultiplexer DEMUX' is connected to the optical switches Ci−2, Ai and Bi.

The output ports D1 and D2 are divided into two arms and respectively connected to the optical switches A1 and B1 and to the optical switches A2 and B2.

The output ports DN+1 and DN+2 are connected to the optical switches CN−1 and CN.

For i from 2 to N, the optical switches Ai, Bi−1 and Ci−1 are connected to the same input port Mi of the multiplexer MUX'.

The optical switch A1 is connected to the input port M1 of the multiplexer and the optical switches BN and CN (N=8) are connected to the input port MN+1 of the multiplexer.

Accordingly, for i from 3 to N, the optical switching stages C, A and B connect any $i^{th}$ output port Di of the demultiplexer DEMUX' to the input port Mi−1, Mi or Mi+1 of the multiplexer MUX'.

The output port D1 of the demultiplexer is connected to the input ports M1 and M2 of the multiplexer via the optical switches A1 and B1 and the output port D2 is connected to the input ports M2 and M3 of the demultiplexer via the optical switches A2 and B2.

Finally, the output port DN+1 of the demultiplexer is connected to the input port MN of the multiplexer via the switch CN−1 and the output port DN+2 is connected to the input port MN+1 of the multiplexer via the switch CN.

The demultiplexed frequencies from the input multiplexes WDM1 and WDM2 are therefore divided as previously and then forwarded or eliminated across the three optical switching stages C, A and B as a function of the activation of the various optical switches. The frequencies are then selectively addressed to the consecutive input ports M1 to MN+1 of the multiplexer MUX'.

To simplify the figure, not all frequencies are shown at the input and output ports of the multiplexer MUX'.

The routing principle employed by the multiplexer MUX' is the same as that already explained with reference to the FIG. 2 diagram.

The optical switches of the optical switching stages C, A and B are activated in the following fashion. The optical switching stages A and B are configured in a complementary fashion. Accordingly, for i and j from 1 to N, i being equal to 4 and N equal to 8 in the FIG. 3 example, the switch Ai is closed and the switches Aj≠i are open and the switch Bi is open and the switches Bj≠i are closed. The stage C is configured in the same fashion as the stage A.

In this particular configuration, corresponding to the FIG. 3 example, considering firstly the first multiplex WDM1, the information i4 coded on the frequency f4 is extracted and leaves at the first output port O1 of the multiplexer MUX', and all the other information i1, i2, i3, i5, i6, i7 and i8 respectively coded on the frequencies f1, f2, f3, f5, f6, f7 and f8 is forwarded to the second higher output port O2 of the multiplexer.

Consider now the second multiplex WDM2 received simultaneously at the input port I2 of the demultiplexer DEMUX'. The information i'4 coded on the frequency f4 is inserted into the output optical spectrum at the output port O2 of the multiplexer MUX'. As the information i'4 coded on the frequency f4 enters the demultiplexer two input ports higher relative to the central input port I1, it is routed two output ports lower at the level of the output ports of the demultiplexer, i.e. to the output port D6.

The information i'4 coded on the frequency f4 is then forwarded to the input port M5 of the multiplexer by activating the optical switch C4. Consequently, the information i'4 is routed one output port higher relative to the central output port O1 of the multiplexer, and is inserted into the output optical spectrum at the level of the output port O2.

This particular configuration of the three optical switching stages therefore extracts (drops) information coded on a particular frequency and inserts (adds) other information coded on the same frequency using a single input port I1, a port I2 dedicated to insertion, an output port O2, and finally a central output port O1 dedicated to extraction.

In this example, the information i4 coded on the frequency f4 is extracted from the signal received at the input port I1 of the extractor and forwarded to the extraction port O1 and other information i'4 coded on the same frequency f4 received at the inserter port I2 is inserted into the signal received at the output port O2 of the device.

The frequency add and drop multiplexer according to the present invention can be reconfigured and operates very fast. Using optical amplifiers as optical switches means that the routing configuration can be modified in less than five nanoseconds.

Also, the arrayed waveguide gratings used are not over-specified, are therefore less complex, and achieve a significant saving in overall size compared to prior art solutions.

Finally, the invention merely requires a single inserter (add) port and a single extractor (drop) port, rather than as many add and drop ports as there are frequencies to be added and dropped.

The invention claimed is:

1. A reconfigurable frequency add and drop multiplexer, comprising:

a demultiplexer having at least two input ports for receiving two wavelength division multiplexes having N channels, and at least N+2 output ports, for all values of i from 1 to N, the $i^{th}$ output port of said demultiplexer being adapted to receive the corresponding $i^{th}$ frequency of a first multiplex received at said first input port, and for any value of i from 3 to N+2, said $i^{th}$ output port of said demultiplexer being adapted to receive the $(i-2)^{th}$ frequency of the second multiplex received at said second input port, a multiplexer having at least N+1 input ports and at least two output ports, for any value of i from 1 to N, the $i^{th}$ input port of said multiplexer being adapted to forward the $i^{th}$ frequency to a first output port of said multiplexer, and for any value of i from 2 to N+1, an $i^{th}$ input port of said multiplexer being adapted to forward the $(i-1)^{th}$ frequency to a second output port of said multiplexer, and optical switches for selectively connecting any $i^{th}$ output port of said demultiplexer, for i from 3 to N, to one of the $(i-1)^{th}$ input port of said multiplexer, the $i^{th}$ input port of said multiplexer, and the $(i+1)^{th}$ input port of said multiplexer, the first and second output ports of said demultiplexer being each respectively connected to the first and second input ports and to the second and third input ports of said multiplexer, and the $(N+1)^{th}$ and $(N+2)^{th}$ output ports of said demultiplexer being each connected respectively to the Nth input ports and to the $(N+1)^{th}$ input port of said multiplexer.

2. The device claimed in claim 1, wherein said demultiplexer and said multiplexer are both of the arrayed waveguide grating type.

3. The device claimed in claim 1 wherein said optical switches consist of three interleaved stages of optical switches.

4. The device claimed in claim 3 wherein said optical switches are optical amplifiers.

5. The device claimed in claim 3, wherein said three interleaved stages of optical switches comprise:

a first set of optical switches $A_i$, where i is from 1 to N;

a second set of optical switches $B_i$, where i is from 1 to N; and a third set of optical switches $C_i$, where i is from 1 to N;

wherein the optical switching stage for $A_i$ is configured complementary to $B_i$, and wherein the optical switching stage for $C_i$ is configured complementary to $B_i$.

* * * * *